Nov. 21, 1933.    R. A. DONNELLY    1,935,621
HEADLIGHT
Filed April 9, 1932
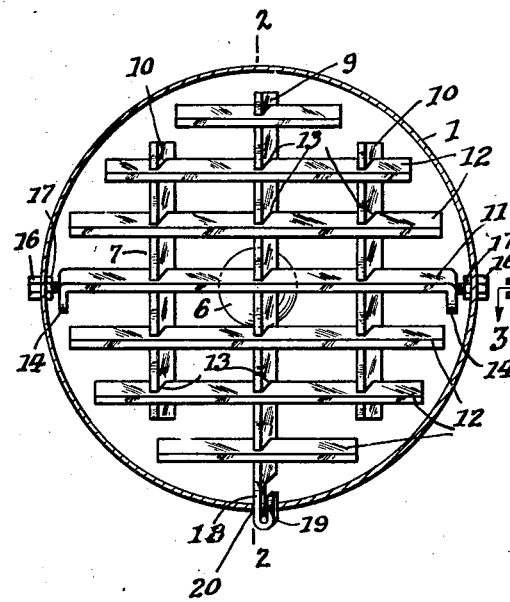
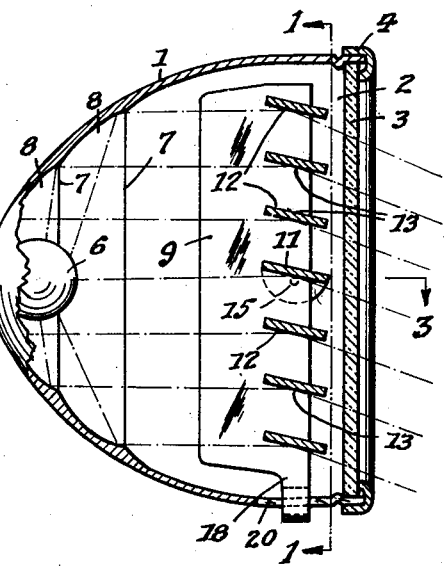
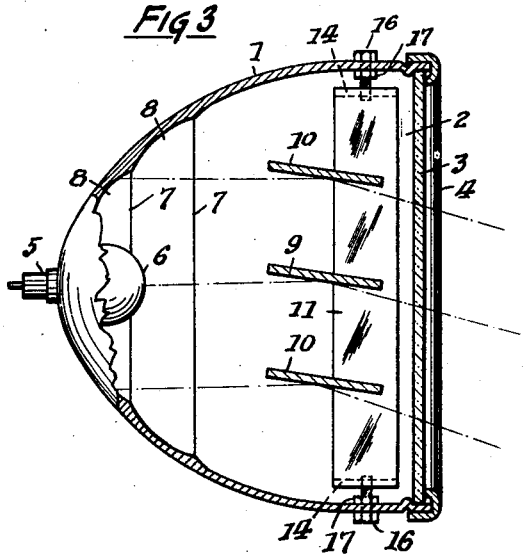
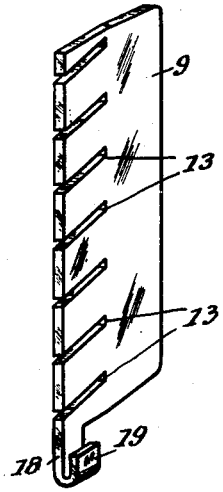
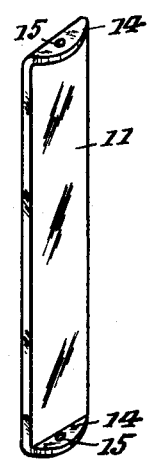
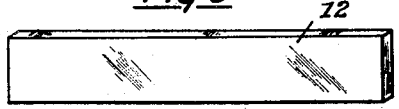
INVENTOR.
RAYMOND A. DONNELLY
BY
Jacobi & Jacobi   ATTORNEYS.

Patented Nov. 21, 1933

1,935,621

UNITED STATES PATENT OFFICE 1,935,621

HEADLIGHT

Raymond A. Donnelly, Newark, N. J.

Application April 9, 1932. Serial No. 604,333

1 Claim. (Cl. 240—45.2)

This invention relates to headlights of the type used upon automobiles and other vehicles and more particularly to a headlight of such construction that while a road will be well lighted, glaring will be eliminated and the driver of an approaching car prevented from being blinded.

One object of the invention is to provide the headlight with an improved type of shield so constructed that it will serve to direct rays of light towards the ground in front of the car instead of straight ahead and thereby produce a light which when viewed at a distance of approximately one hundred feet will be similar to an unshielded light and cause a road to be well lighted for a long distance but from which the glare will gradually diminish as a person approaches the car and disappear when about fifteen or twenty feet away.

Another object of the invention is to so form the shield that portions thereof will serve to hold horizontal reflectors in desired spaced relation to each other at a determined angle and also serve as deflectors to direct the light towards the right and permit the gutter side of a road to be well illuminated without over illumination of the central or left hand portion of the road taking place and resulting danger of the light glaring into the eyes of an approaching driver.

Another object of the invention is to permit the shield to be easily adjusted to dispose the horizontal deflectors at a desired incline and then firmly secured in the set position.

Another object of the invention is to so form the portion of the headlight reflector about the bulb that light rays can be projected forwardly without crossing and a very good light produced.

Still another object of the invention resides in providing a headlight which is simple and durable in construction, inexpensive to manufacture and one which will be very efficient in use.

With these and numerous other objects in view, my invention consists in the novel features of construction, combination and arrangement of parts as will be hereinafter referred to and more particularly pointed out in the specification and claim.

In the accompanying drawing forming a part of this application:

Figure 1 is a transverse sectional view taken vertically through the improved headlight along the line 1—1 of Figure 2;

Figure 2 is a longitudinal section taken vertically through the headlight along the line 2—2 of Figure 1;

Figure 3 is a horizontal section taken along the line 3—3 of Figure 2;

Figure 4 is a perspective view of the central one of the vertical deflectors;

Figure 5 is a perspective view of the central one of the horizontal deflectors;

Figure 6 is a perspective of one of the other horizontal deflectors.

Referring to the drawing wherein like characters designate corresponding parts throughout the several views, the numeral 1 designates a headlight casing which is open at its front and adjacent its front has its walls crimped inwardly to form a circumferentially extending bead 2 against which fits a lens 3 held in place by a rim 4. The usual socket 5 is provided to carry a bulb 6 which is centrally located at the back of the casing and the inner surface of the casing is polished to provide a reflector.

The casing or shell 1 when viewed externally has the general shape of a parabola but its inner surface about the lamp socket is formed with circumferentially extending ribs 7 defining transversely arcuate sections 8 concentric to the bulb and each other. Referring to Figures 2 and 3, it will be seen that rays of light from the bulb after striking walls of the reflector will be directed forwardly and pass outwardly through the lens 3.

It is desired to permit a road to be well lighted for the necessary distance in front of an automobile without danger of the driver of an approaching car being blinded by glaring headlights. I have therefore provided a shield or shutter consisting of vertically extending plates or uprights 9 and 10 serving as deflectors to direct light rays towards the right and a series of horizontal plates or slats 11 and 12 serving as deflectors to direct light rays towards the ground in front of the car instead of straight ahead. Each of the uprights is formed with slots 13 leading from its front edge to receive the horizontal deflectors and it should be noted that the slots extend rearwardly at an upward incline and thereby establish a fixed angular relation between the uprights and horizontal deflectors and cause light rays which strike these horizontal deflectors to be always deflected downwardly towards the ground in front of the automobile. The vertical deflectors or uprights extend diagonally of the horizontal deflectors when viewed in top plan as shown in Figure 3 and will serve very effectively to direct rays of light towards the right and cause a ditch or gutter along this side of a road to be well lighted.

The horizontal deflectors have their under faces polished to form reflecting surfaces which direct the light rays downwardly towards the ground in front of the car but the upper faces of these deflectors are dull and therefore any rays striking these faces will be projected forwardly and illuminate a road well ahead of the car without causing a blinding glare.

It is desired to permit the shield to be adjusted in order to control the angle at which the rays are projected forwardly by the under faces of the plates or strips 11 and 12 and in order to do so the strip 11 has its end portions bent to form ears 14 which are perforated as shown at 15 to receive the inner ends of pivot bolts 16. The bolts are passed inwardly through openings formed in side portions of the casing 1 and carry nuts 17 which when tightened will firmly hold the bolts in place and cause the shield to be held in a set position. The lower end of the vertical strip or upright 9 carries a depending finger or tongue 18 which is bent back upon itself as shown at 19 so that it can be easily grasped and projects outwardly through a slot 20 formed in the casing 1 longitudinally thereof. By this arrangement, the tongue can be grasped by its outer end and pressure exerted to swing the shield about the pivot bolts and dispose the horizontal deflectors at a desired incline.

When this improved headlight is in use, light rays emitted by the bulb 6 are projected towards the front of the casing and pass through the shield between the vertical and horizontal deflectors. Certain of the rays strike the walls of the casing and are then projected forwardly in spaced parallel relation to each other to the deflectors of the shield while others are projected directly to the deflectors from the bulb.

The polished under faces of the horizontal strips deflect the rays downwardly so that they strike the ground in front of the car and the fact that the vertical strips are inclined as shown in Figure 3 causes the light to be directed towards the right. A certain amount of light passes forwardly through the shield without being deflected downwardly but since the upper faces of the horizontal strips are dull a glaring light will be prevented. By this arrangement, the road will be well illuminated in front of the car and at the right and also for a long enough distance ahead to permit safe driving. At a distance of about one hundred feet the headlights appear similar to one not equipped with shields but as a person approaches the car, the glare will gradually diminish and disappear when about fifteen feet away. Therefore, there will be no danger of the driver of an approaching car being blinded by the headlights and colliding or running off the road.

From the foregoing description of the construction of my improved headlight, the application of the same to use will be readily understood. It will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to, without departing from the spirit or sacrificing any of the principles of the invention.

Having thus described the invention, what I claim is:

In a headlight, a shell open at its front and constituting a reflector, a lens closing the open front of said shell, a bulb in said shell, light being directed forwardly from said bulb through said lens, and a deflector in said shell back of said lens consisting of horizontally extending deflector plates disposed one above another and vertical plates spaced transversely from each other and interengaged with the horizontal plates to brace the horizontal plates and retain the same in spaced relation to each other, a horizontal plate intermediate the height of the deflector having its ends bent to form ears, pivots extending through walls of the shell from opposite sides thereof and engaging said ears to pivotally mount the deflector, and a vertical plate intermediate the width of the deflector having its lower end reduced to provide a depending tongue bent back upon itself and extending outwardly through a slot formed in the lower portion of the shell whereby the outer portion of the tongue may be grasped and the deflector tilted about its pivots to dispose the horizontal plates at a desired angle.

RAYMOND A. DONNELLY.